United States Patent
Espinasse

(10) Patent No.: US 7,530,766 B2
(45) Date of Patent: May 12, 2009

(54) DEVICE AND METHOD FOR LAYING RIGID TUBULAR PIPES

(75) Inventor: Philippe Espinasse, Bihorel (FR)

(73) Assignee: Technip France (FR)

( * ) Notice: Subject to any disclaimer, the term of this patent is extended or adjusted under 35 U.S.C. 154(b) by 418 days.

(21) Appl. No.: 10/587,492

(22) PCT Filed: Jan. 10, 2005

(86) PCT No.: PCT/FR2005/000050

§ 371 (c)(1),
(2), (4) Date: Sep. 11, 2006

(87) PCT Pub. No.: WO2005/083227

PCT Pub. Date: Sep. 9, 2005

(65) Prior Publication Data

US 2007/0102922 A1    May 10, 2007

(30) Foreign Application Priority Data

Jan. 27, 2004    (FR) .................................. 04 00757

(51) Int. Cl.
*F16L 1/12* (2006.01)
(52) U.S. Cl. .................. 405/169; 405/170; 166/380
(58) Field of Classification Search ................. 405/166, 405/169, 170; 166/380
See application file for complete search history.

(56) References Cited

U.S. PATENT DOCUMENTS 4,100,968 A    7/1978    Delano ....................... 166/315

FOREIGN PATENT DOCUMENTS

WO    WO 99/35429 A    7/1999

OTHER PUBLICATIONS

International Search Report PCT/FR2005/000050 Jun. 3, 2005.

*Primary Examiner*—Tara L. Mayo
(74) *Attorney, Agent, or Firm*—Ostrolenk, Faber, Gerb & Soffen, LLP

(57) ABSTRACT

A device for laying pipes from a laying vessel. The pipes convey a fluid within. The device comprises a lower retaining device to retain a pipe and a lower securing device to support the lower retaining device. An upper retaining device retains the pipe and is able to move translationally with respect to the lower retaining device. Both retaining devices retain the pipe from the inside. An upper securing device to which the lower retaining device can be coupled through a pipe section to be connected in order to release the lower securing device and in order to secure thereto the said upper retaining device after the then lower pipe section has been connected and submerged.

14 Claims, 2 Drawing Sheets

DEVICE AND METHOD FOR LAYING RIGID TUBULAR PIPES

CROSS REFERENCE TO RELATED APPLICATION

The present application is a 35 U.S.C. §§371 national phase conversion of PCT/FR2005/000050, filed 10 Jan. 2005, which claims priority of French Application No. 0400757, filed 27 Jan. 2004. The PCT International Application was published in the French language.

BACKGROUND OF THE INVENTION

The present invention relates to a device and a method for laying rigid tubular pipes on the seabed using a laying vessel.

More specifically, this device is designed for so-called J-lay methods, which make it possible to install the pipe without plastic deformation.

It is known for devices such as this intended for laying underwater pipes to include a tower which can be inclined on a working platform and in which a moon pool is provided for example, and means for holding and translationally driving pipe sections, which sections are assembled sequentially to form the pipe which is then submerged.

The pipe sections, which are preassembled on the vessel or on land, are brought sequentially to the said tower and are held by retaining means which for their part are mounted so that they can move translationally up and down the tower. Lower retaining means are mounted in the lower part of the tower and they are designed to hold a free end of the pipe submerged, while upper retaining means are intended to retain a pipe section to be connected.

These retaining means comprise clamping jaws which grip around the outer wall of the pipe sections so as to prevent them from moving translationally. Reference may be made particularly to document WO 99/35429, which describes such retaining means.

However, these clamping jaws necessarily compress the pipes and run the risk of damaging them. This probability is all the likelier in the case of pipes having an outer covering, for example a thermal insulation layer or even an anticorrosion covering.

A problem which arises and which the present invention aims to solve is thus that of providing a device and a method which make it possible to install underwater pipes without damaging them.

SUMMARY OF THE INVENTION

To this end, according to a first subject, the present invention proposes a device for laying rigid tubular pipes from a working platform of a laying vessel. The pipes, which are designed to convey a fluid within, are laid by successively, connecting at the said working platform pipe sections which are oriented in a direction between an inclined direction and a vertical direction. The device comprises lower retaining means designed to retain a pipe and lower securing means designed to support the retaining means at the platform, upper retaining means designed to retain the pipe and being able to move translationally with respect to the lower retaining means. The retaining means are designed to retain the pipe from the inside, and the device additionally comprises upper securing means to which the lower retaining means can be coupled through a pipe section to be connected, in such a way as to release the lower securing means and to be able to secure thereto the upper retaining means after the section to be connected has been connected and submerged.

Thus, a characteristic of the invention lies in the use of retaining means which are designed to retain the pipe from the inside, thus not running the risk of damaging its outer covering, and which can be coupled to upper securing means through a pipe section to be connected. Consequently, not only is the pipe not damaged but, in addition, the device is able to be installed on existing means without major modifications.

According to a particularly advantageous embodiment of the invention, the retaining means include a locking sleeve prolonged by a cleat. The locking sleeve is designed to be activated so as to expand inside the pipeline in order to be locked therein either by friction or by indentation. Consequently, this sleeve is prevented from translational movement in the pipe, which can then be retained by a cleat situated outside the pipe or outside the pipe section.

Advantageously, the lower retaining means are provided with a centering sleeve mounted between the locking sleeve and the cleat. The centering sleeve is designed to extend between the pipe and a pipe section to be connected. Consequently, whereas the locking sleeve retains the pipe, the centering sleeve is for its part designed to be fitted partly into the pipe and to project therefrom so that the pipe section to be connected can be fitted thereon, which pipe section may then be welded to the pipe.

According to a particularly advantageous characteristic of the invention, the lower retaining means are coupled to the upper securing means by first means forming a sling. Consequently, it is relatively easy to insert these first sling-forming means into the pipe section since they are relatively thin and flexible and, nevertheless, they are designed to withstand high tensile stresses, particularly in order to retain the pipe, as will be described in the remainder of the description.

Preferably, the upper retaining means are designed to be traversed freely by the first sling-forming means, which makes it possible for the pipe and the pipe section to be connected to be held independently of one another before they are connected.

The upper securing means advantageously comprise first means for translationally driving the first sling-forming means, so as to be able to submerge the connected pipe section while retaining the pipe, until the upper retaining means are secured to the lower securing means.

Particularly advantageously, the upper retaining means are mounted on second means forming a sling, the second sling-forming means being driven translationally by second drive means mounted on the securing means, so as to be able to translationally drive the pipe section to be connected and to fit it onto the pipe in order to couple it thereto.

According to a second subject, the present invention proposes a method of laying tubular pipes by using the laying device as described above.

According to a particular embodiment, the method comprises the steps below in the following order: a) the lower retaining means, which are fastened to a pipe, are secured to the lower securing means; then b) the lower retaining means are coupled to the upper securing means through a pipe section to be connected, in such a way as to release the lower securing means and to connect the section and the pipe; and c) the upper retaining means are secured to the lower securing means after the connected section has been submerged.

Thus, according to the method, the load constituted by the pipe is transferred from the lower securing means to the upper securing means through the pipe section to be connected, which then makes it possible to fit and to connect the section to the pipe while keeping the pipe in a fixed position with respect to the said platform where the connecting means are situated.

BRIEF DESCRIPTION OF THE DRAWINGS

Other particular features and advantages of the invention will emerge on reading the description presented below of a specific embodiment of the invention, given by way of illustration but with no limitation being implied, with reference to the appended drawings, in which.

DESCRIPTION OF A PREFERRED EMBODIMENT

Figure 1:
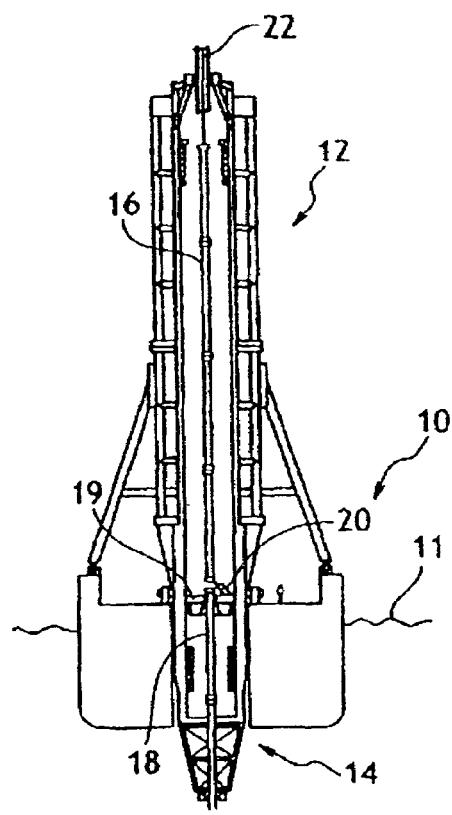
FIG. 1 is a schematic front view of a laying device according to the invention.
Figure 2:
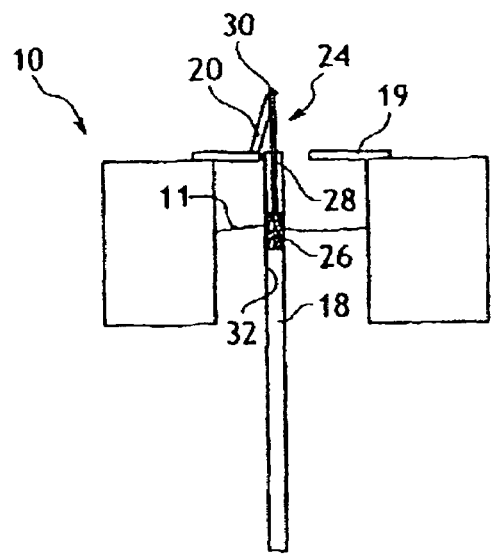
FIG. 2 is a schematic detail view in vertical section of the laying device illustrated in FIG. 1, in a first step of the method.

FIG. 1 is a cross-sectional illustration of a laying vessel 10 on the water surface 11, this vessel being equipped with a tower 12 which rises above a moon pool 14. The tower 12 supports a pipe section 16 to be connected which is positioned at the end of a pipe 18, the latter passing through the moon pool 14.

A working platform 19 extends around the periphery of the moon pool 14 and lower securing means 20 are situated on this working platform 19 and rise above the moon pool 14. Furthermore, upper securing means 22 situated at the upper end of the tower 12 make it possible, in particular and in this figure especially, to hold the pipe section 16 to be connected.

Having described the primary structural elements of the device according to the invention, a description will be given below, with reference to FIGS. 2 to 8, of the successive steps of employing the said device.

FIG. 2 again shows the laying vessel 10 in cross section, and the working platform 19. Also shown again are the lower securing means 20 and the end of the pipe 18. As shown distinctly in this FIG. 2, the end of the pipe 18 is retained by retaining means 24 which comprise an inner locking sleeve 26 prolonged by a rod 28 which for its part extends outside the pipe 18 and is terminated by a cleat 30, which cleat 30 is engaged in the lower securing means 20.

The locking sleeve 26 is designed to slide in the pipe 18 in an inactive position and it is designed to be activated, either by self-locking means or by control means, so that it bears forcefully against an inner wall 32 of the pipe 18, in an active position. Thus, the locking sleeve is in bearing contact and it is locked by friction or by indentation. In this position, the locking sleeve is completely fastened translationally to the pipe 18, with the result that the end of the pipe 18 is completely fastened and bears against the inside of the lower securing means 20, and is therefore fastened to the laying vessel 10.

In FIG. 3, which again shows all the above-described elements, the pipe section 16 has been positioned vertically over the end of the pipe 18 by the sling 38. Furthermore, the cleat 30 has been coupled to a first sling 34 which passes all the way through the section 16 and the said cleat has been detached from the lower securing means. This first sling 34, which is coupled to translational drive means (not shown) fastened to the upper securing means 22 (not shown in this figure) then completely supports the lower retaining means 24 and, consequently, the pipe 18.

Moreover, upper retaining means 36 have been installed at the upper end of the section 16; they essentially include a second, inner locking sleeve 37, similar to the preceding locking sleeve 26, and they are designed to allow free passage of the first sling 34 which passes through them centrally. Furthermore, a second sling 38, coupled to the second locking sleeve 37 and to the upper securing means, makes it possible to drive the section 16 translationally by virtue of dedicated drive means (not shown).

Figure 3:
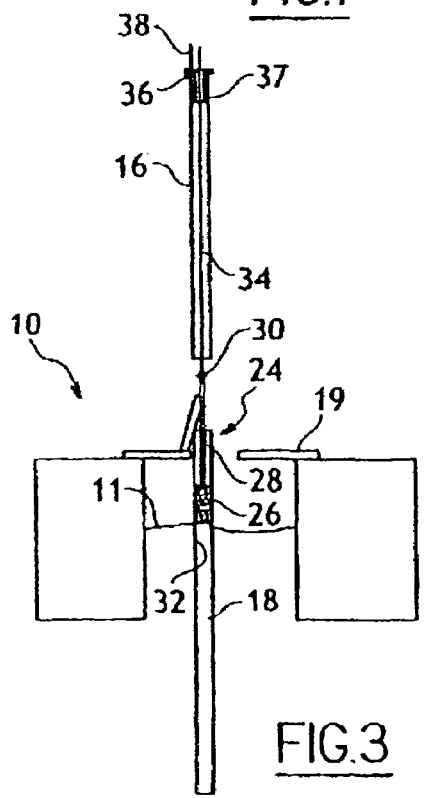
FIG. 3 is a schematic detail view of the laying device in a second step of the method.

In FIG. 3, the weight of the pipe 18 is taken up by the first sling 34. It is thus possible to move away the lower securing means. Subsequently, the centering sleeve 37 is inserted at the end of the pipe section 16. The section 16 is then lowered and welded to the pipe 18. Non-destructive tests may then be carried out and the desired covering is applied at the junction between the pipe 18 and the section 16.

Figure 4:
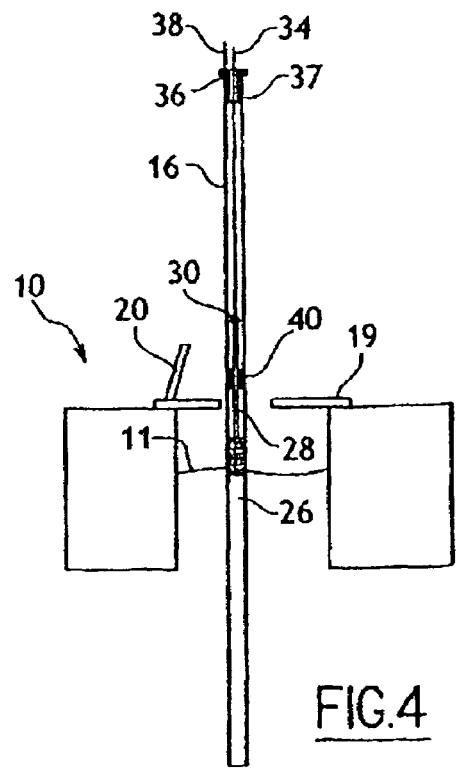
FIG. 4 is a schematic detail view illustrating the laying device during a third step of the method, the connection step.

The dedicated drive means makes it possible in particular to fit the section 16 onto the end of the pipe 18, as illustrated in FIG. 4. In order to facilitate this fitting and, more precisely, the centering of the section 16 and the pipe 18, a centering sleeve 40 has been fitted onto both ends, i.e. the end of the pipe 18 and the end of the section 16, and between the locking sleeve 26 and the cleat 30 around the rod 28.

Figure 5:
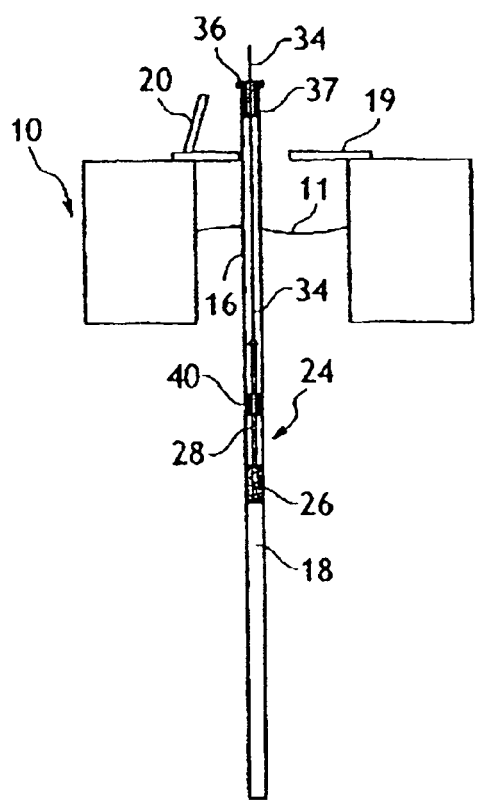
FIG. 5 is a schematic detail view illustrating the device during a fourth step of the method, corresponding to submersion.

After the section 16 and the pipe 18 have been welded together, the drive means for the sling 34, which is still retaining the lower retaining means 24, make it possible to lower the section 16, which now forms part of the overall pipe 18. As illustrated in FIG. 5, the lower retaining means 24 then sink under the water surface 11, while the upper retaining means 36 are brought closer to the lower securing means 20.

Figure 6:
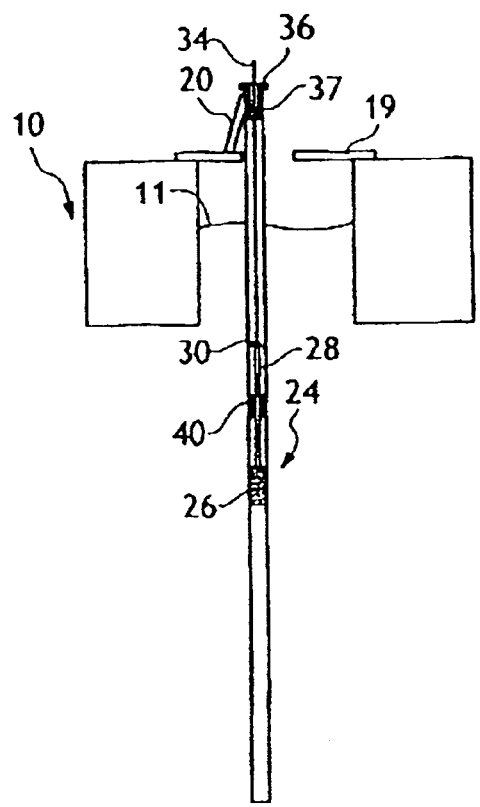
FIG. 6 is a schematic detail view in a fifth step of the method.
Figure 7:
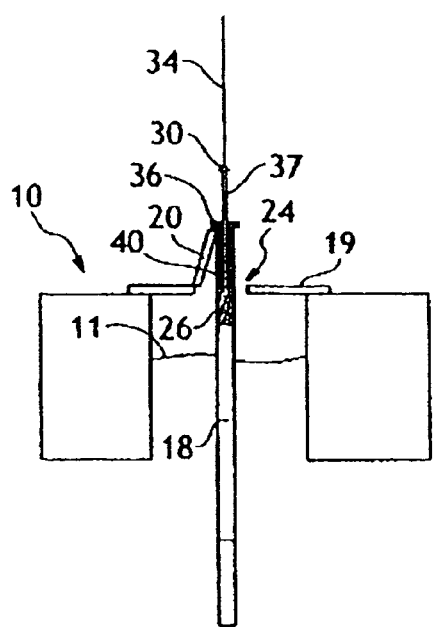
FIG. 7 is a schematic detail view illustrating the laying device in a sixth step of the method.

In FIG. 6, after the sling 34 has stopped being driven, the upper retaining means 36 are engaged in the lower securing means 20 in such a way as to transfer the load of the pipe 18 from the upper retaining means to these lower securing means 20. Thus, the locking sleeve 26 of the lower retaining means 24 is deactivated so that, by driving the sling 34, it can be lifted back up, together with the centering sleeve 40, into the vicinity of the working platform 19, in the end of the pipe 18. FIG. 7 illustrates the lower retaining means lifted back up.

Next, activating the locking sleeve 26 once more causes it to be locked in the pipe 18 and it is once more possible to transfer the load of the pipe 18 to the upper securing means by way of the first sling 34.

Figure 8:
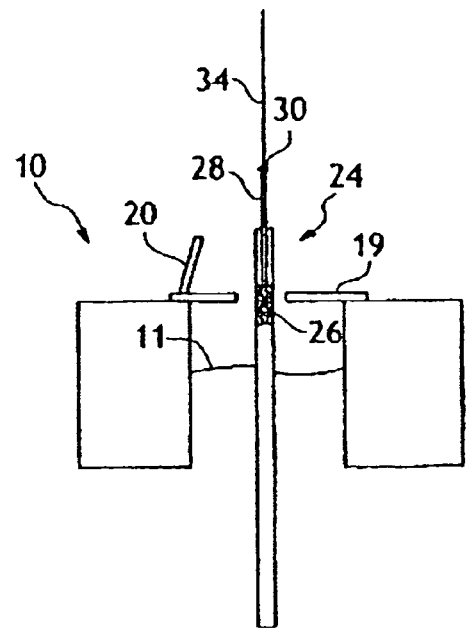
FIG. 8 is a schematic detail view illustrating the laying device in a final step before returning to the first step.

Thus, as illustrated in FIG. 8, the upper retaining means 36 can be released from the lower securing means 20 and from the pipe 18 so that they can be mounted once more on another pipe section to be connected. Moreover, starting from this position, the first sling 34 can be driven in order once more to secure the cleat 30 in the lower securing means 20 so as to return to the situation illustrated in FIG. 2.

Thus, by recommencing this cycle a given number of times relative to the desired length, the pipe is submerged and deposited in the seabed.

The invention claimed is:

1. Device for laying tubular pipes from a working platform the pipes, being laid by successively connecting, at the said working platform, pipe sections which are oriented in a direction between an inclined direction and a vertical direction, the device comprising:
- a lower retaining device operable to retain a pipe, and a lower securing device operable to support the lower retaining device at the platform,
- an upper retaining device operable to retain the pipe and operable to move translationally toward or away from the lower retaining device, the upper and lower retaining devices each including elements operable to retain the pipe sections from inside the pipe sections,
- an upper securing device to which the lower retaining device can be coupled through a pipe section to be connected, in such a way as to release the lower securing device and to be able to secure thereto the upper retaining device after the pipe section to be connected has been connected and submerged.

2. Laying device according to claim 1, wherein the retaining devices each include a locking sleeve prolonged by a cleat, the locking sleeve being operable to be activated to expand inside the pipeline in order to be locked therein to retain a respective pipe section in which the locking sleeve is disposed.

3. Laying device according to claim 2, wherein the lower retaining device is provided with a centering sleeve mounted between the locking sleeve and the cleat, the centering sleeve being operable to extend between the pipe and a pipe section to be connected.

4. Laying device according to claim 1, further comprising a sling device coupling the lower retaining device to the upper securing device.

5. Laying device according to claim 4, wherein the upper retaining device is operable to be traversed freely by the sling device.

6. Laying device according to claim 5, wherein the upper securing device comprises a first translational device operable for driving the sling device.

7. Laying device according to claim 1, further comprising a second sling device and the upper retaining device is mounted on the second sling device, a second drive driving the second sling device translationally, the second drive being mounted on the upper securing device.

8. A method for laying tubular pipe, comprising:
- retaining an upper end of a first pipe section at a lower securing device located at a working platform, by attaching a lower retaining device at a location toward the pipe upper end of the first pipe and by attaching the lower retaining device to the lower securing device at the platform;
- positioning a lower end of a second pipe section over the upper end of the first pipe section;
- detaching the lower retaining device from the lower securing device and attaching the lower retaining device to an upper retaining device toward an upper end of the second pipe section;
- attaching the lower end of the second pipe section to the upper end of the first pipe section;
- lowering the first and second pipe sections, while the lower retaining device is attached to the first pipe section, until the upper retaining device is at the lower securing device, and engaging the lower securing device and the upper retaining device;
- releasing the lower retaining device from the first pipe section and raising and then attaching the lower retaining device toward the lower end of the second pipe section; and
- releasing the upper retaining device from the lower securing device.

9. The method of claim 8, wherein the lower retaining device is attached toward the upper end of the first pipe section and on an interior of the first pipe section.

10. The method of claim 9, wherein the positioning of the second pipe section over the first pipe section includes attaching the upper retaining device toward an upper end of the second pipe section.

11. The method of claim 10, wherein the upper retaining device is attached toward the upper end of the second pipe section and on an interior of the second pipe section.

12. The method of claim 9, wherein the lower retaining device comprises a sling which is disposed inside the pipe sections and is passed through the second pipe section to the upper retaining device.

13. A method for laying tubular pipe, comprising:
- retaining an upper end of a first pipe section at a lower securing device which is located at a working platform by attaching a lower retaining device at a location toward the upper end of the first pipe section and by attaching the lower retaining device to the lower securing device at the platform;
- positioning a lower end of a second pipe section over the upper end of the first pipe section by a lower sling, and fastening the lower sling to an upper securing device above the second pipe section, wherein the lower sling supports the lower retaining device and supports the weight of the first pipe section;
- installing an upper retaining device toward the upper end of the second pipe section;
- connecting an upper sling to the upper retaining device and to an upper securing device for supporting the weight of the first pipe section by the lower sling;
- removing the lower securing device from the first pipe section;
- lowering the second pipe section to the first pipe section and then attaching the lower end of the second pipe section to the upper end of the first pipe section;
- with the lower sling retaining the lower retaining device, lowering the second pipe section which is together with the first pipe section, and thereby lowering the lower retaining device and thereby also lowering the upper retaining device toward the lower securing device;
- engaging the upper retaining device in the lower securing device so as to transfer the load of the first pipe section from the upper retaining device to the lower securing device;
- disconnecting the lower securing device from the lower retaining device enabling the lower sling to be raised up to the vicinity of the working platform at the upper end of the first pipe section;
- activating the lower retaining device to lock it to the first pipe section making a transfer of the load of the first pipe section to the upper securing device via the lower sling;
- releasing the upper retaining device from the lower securing device and from the first pipe section so that the upper retaining device can be connected on another pipe section.

14. The method of claim 13, wherein the upper sling and the retaining device engage the respective pipe section on the interior of the pipe thereof and the retaining means and slings move through the pipe sections between the positions thereof.

* * * * *